Patented Jan. 7, 1936

2,026,629

UNITED STATES PATENT OFFICE 2,026,629

DYESTUFF INTERMEDIATE

Norman Hulton Haddock, Blackley, Frank Lodge, Manchester, and Robert Robinson, Oxford, England, assignors to Imperial Chemical Industries Limited, a corporation of Great Britain No Drawing. Application December 19, 1933, Serial No. 703,150. In Great Britain December 20, 1932

7 Claims. (Cl. 260—103)

The present invention relates to the manufacture of new dyestuff intermediates of the general formula

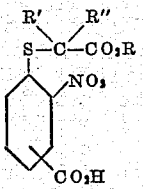

where R stands for hydrogen or an alkyl, aryl or aralkyl group, while R' and R'' each stands for hydrogen or an alkyl, aryl or aralkyl group.

It further contemplates the preparation of new bodies of the general formula

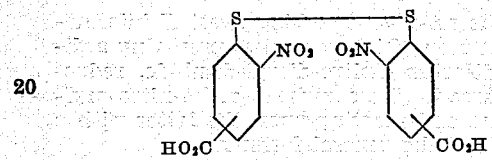

which may serve as intermediates for the preparation of the dyestuff intermediates aforementioned. In general, this invention relates to the manufacture of intermediates adapted for use in the manufacture of dyestuffs by the process described in applications Serial Nos. 689,044 and 702,416.

According to the invention we cause to interact a halogenonitrobenzoic acid in which the nitro group and halogen atom are located ortho to one another with an alkali sulphide, polysulphide, thiocyanate or xanthate and, if necessary, we oxidize or hydrolyze and oxidize the so-obtained products; or alternatively, we treat a diazotized nitroaminobenzoic acid in which the nitro and amino groups are located ortho to one another with an alkali disulphide, or xanthate and, if necessary, hydrolyze and oxidize the product.

The new intermediates thus obtained may be represented by the general formula

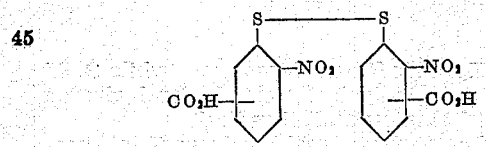

where the line to the centre of the hexagon indicates that the carboxyl group may stand in any unoccupied position therein.

By a further feature of the invention we convert, if necessary, the substituted diphenyldisulphide-dicarboxylic acids to mercaptans by reduction and we treat the mercaptans so-obtained or obtained as described in the second paragraph above with an α-halogeno-fatty acid or an ester thereof. We thus obtain other valuable new intermediates, to which the following general formula may be given:—

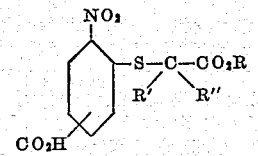

where R stands for hydrogen or an alkyl, aryl, or an aralkyl group, and R', and R'' each stands for hydrogen or an alkyl, aryl or aralkyl group.

The invention is illustrated but not limited by the following examples, in which the parts are by weight.

Example 1

250 parts of 4-chloro-3-nitrobenzoic acid m.p. 180° C. are dissolved in 2500 parts of warm water (40° C.) containing 140 parts of sodium carbonate. 230 parts of a 30% aqueous solution of sodium hydrosulphide are quickly added and the temperature is raised to 50° C. in ¼ hour. After a short time the solution darkens and cooling is now applied, if necessary, to prevent the temperature from rising above 50° C. The reaction is complete after 1 hour at 50° C. Sulphur is removed by filtration at 20° C., and the clear filtrate is added at 80–90° C. to 6000 parts of 3% aqueous hydrochloric acid, with good stirring. The pale-yellow product is filtered off and washed thoroughly with hot water. It is purified, if necessary, by washing with or crystallizing from methylated spirits.

The so-obtained 2:2'-dinitro-4:4'-dicarboxy-diphenyldisulphide is a pale buff colored substance yielding a violet coloration in cold dilute caustic soda solution. It can be crystallized from boiling alcohol yielding pale-yellow crystals having melting point 302° C. with decomposition. The acid chloride, prepared by the action of phosphorus pentachloride in xylene, yields yellow crystals, melting point 218° C.

Example 2

182 parts of 3-nitro-4-aminobenzoic acid, m.p. 282° C., are dissolved in 4000 parts of water and the calculated quantity of caustic soda. 70 parts of sodium nitrite are added to the solution. Diazotization is effected by running the solution into 340 parts of 36% aqueous hydrochloric acid mixed with enough chopped ice to keep the mixture below 20° C. The diazo solution is cooled below 4° C., filtered, if necessary, and added to a cold solution of sodium disulphide prepared by boiling together 240 parts of sodium sulphide crystals, 120 parts caustic soda liquor 70° Tw., and 32 parts of sulphur. The mixture is kept alkaline to brilliant yellow paper by adding caustic soda as needed. Stirring is continued until evolution of nitrogen has ceased. The solution is then acidified with hydrochloric acid and the precipitate filtered off and washed. It is identical with that of Example 1.

Example 3

30 parts of 2:2'-dinitro-4:4'-dicarboxyldiphenyldisulphide, 30 parts of sodium sulphide crystals and 300 parts of methylated spirits are stirred at the ordinary temperature for ½ hour. To the dark solution of 2-nitro-4-carboxythiophenol are added 50 parts of glacial acetic acid, 30 parts of sodium acetate and 40 parts of ethylchloroacetate. The mixture is stirred and boiled under a reflux condenser for 2 hours. To the hot solution water is added. The oily matter which separates solidifies on cooling and standing. This is ethyl 2-nitro-4-carboxyphenylthioglycollate. It is purified if desired by dissolving it in cold dilute aqueous sodium carbonate solution, stirring with bone black, filtering and precipitating the filtered solution with mineral acid. When crystallized from alcohol the compound has m.p. 165° C.

Ethylchloroacetate may be substituted by other halogenated fatty acids or their esters, for example, α-bromopropionic, α-bromo-n-butyric, α-bromoisobutyric, the thioglycollic acids thus obtained being then those in which R' and R" in the general formula for the thioglycollic acids are, either or both substituted by alkyl.

Example 4

45 parts of 4-nitro-3-aminobenzoic acid are dissolved in 100 parts of water and 30 parts of N. caustic soda solution. 2 parts of sodium nitrite are added and the mixture added to 100 parts of N. hydrochloric acid over half an hour. The temperature is maintained at below 20° C. After stirring for a further 1½ hours a sodium carbonate solution is added until the mixture is neutral. This is then added to a mixture of 4 parts of sodium ethylxanthate in 40 parts of water at 65–70° C. Soda ash is occasionally added as needed to keep the solution alkaline. Hydrochloric acid is added to precipitate the xanthate ester. The so-obtained oil is separated and heated with 40 parts of 80% sulphuric acid at 160° C. for 15 minutes. The acid mixture is cooled, filtered through asbestos and the product washed with water. It is purified by crystallization from alcohol when it is obtained as pale yellow needles, m. p. 283° (decomposed). It dissolves in dilute caustic soda giving a greenish-blue solution which becomes pale yellow on standing.

This di-nitrodicarboxyldiphenyldisulphide may be converted to a thioglycollic acid by the process of Example 3, using either ethylchloroacetate, α-bromopropionic acid, or the α-bromobutyric acids.

Example 5

7 parts of 3-chloro-4-nitrobenzoic acid are dissolved in 16 parts of ammonia, Sp. Gr., 0.890, and 20 parts of sodium disulphide 20% solution are added during 3 minutes at 50° C. After heating to 75° C. for 10 minutes the deep-orange mixture is acidified with hydrochloric acid and the product filtered off. The orange colored filter-cake is then stirred with dilute sodium carbonate solution, filtered to remove sulphur and reprecipitated with hydrochloric acid. After boiling with 5% hydrochloric acid for ¼ hour the product is again filtered, washed well with water and dried. After crystallization from alcohol the product is identical with that of Example 4.

Example 6

The process of Examples 1 and 2, may also be applied to substituted derivatives, including chloro, bromo, methyl, ethyl and nitro derivatives. One particular substituted derivative which may be used by the process of Example 1 is 4-chloro-3,5-dinitrobenzoic acid, the corresponding body applicable for use by the process of Example 2 is 3,5-dinitro-4-aminobenzoic acid.

The resulting disulphides obtained from such substituted derivatives may be converted to thioglycollic acids by the process of Example 3.

It will be clear that our novel compounds are capable of existing either in the form of their free acids or in the form of metal salts, either form being readily convertible into the other by steps which are per se well known. It should therefore be understood that in the claims below, the expression "which in the form of its free acid has the formula (so and so)" when referring to a compound or intermediate, is intended as a generic expression to cover both the free acid and the readily-obtainable salts thereof.

We claim:

1. In the process of making dyestuff intermediates, the step which comprises preparing a dicarboxy-di-ortho-dinitro-diaryl-disulfide, reducing the same to give a carboxy-ortho-nitro-aryl-mercaptan, and reacting upon the latter with a compound of the general formula

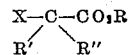

wherein X stands for a halogen atom, while R, R' and R" each individually stands for hydrogen or an alkyl, aryl or aralkyl radical.

2. In the process of making dyestuff intermediates, the step which comprises preparing a dicarboxy-di-ortho-dinitro-diaryl-disulfide, reducing the same to give a carboxy-ortho-nitro-aryl-mercaptan, and reacting upon the latter with a halogeno-acetic acid to produce a carboxy-nitro-aryl-thioglycollic acid.

3. In the process of making dyestuff intermediates, the step which comprises reacting a dicarboxy-di-ortho-dinitro-diaryl-disulfide with a reducing agent to produce a carboxy-ortho-nitro-aryl-mercaptan, and reacting upon the latter with a compound of the general formula

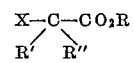

wherein X stands for a halogen atom, while R, R' and R" each individually stands for hydrogen or an alkyl, aryl or aralkyl radical.

4. In the process of making dyestuff intermediates, the step which comprises reacting a dicarboxy-di-ortho-dinitro-diaryl-disulfide with a reducing agent to produce a carboxy-ortho-nitro-aryl-mercaptan, and reacting upon the latter with a halogeno-acetic acid to produce a carboxy-nitro-aryl-thioglycollic acid.

5. An organic compound which in the form of its free acid corresponds to the formula

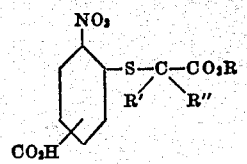

wherein R, R' and R" individually represent hydrogen or an alkyl, aryl or aralkyl group.

6. An organic compound which in the form of its free acid corresponds to the formula

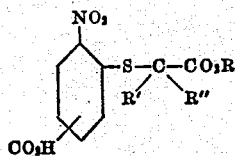

wherein R stands for hydrogen or an alkyl group, while R' and R" individually represent hydrogen or methyl groups.

7. A compound which in the form of its free acid has the formula

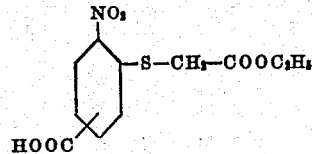

and melts at about 165° C.

NORMAN HULTON HADDOCK.
FRANK LODGE.
ROBERT ROBINSON.